Figure 1:
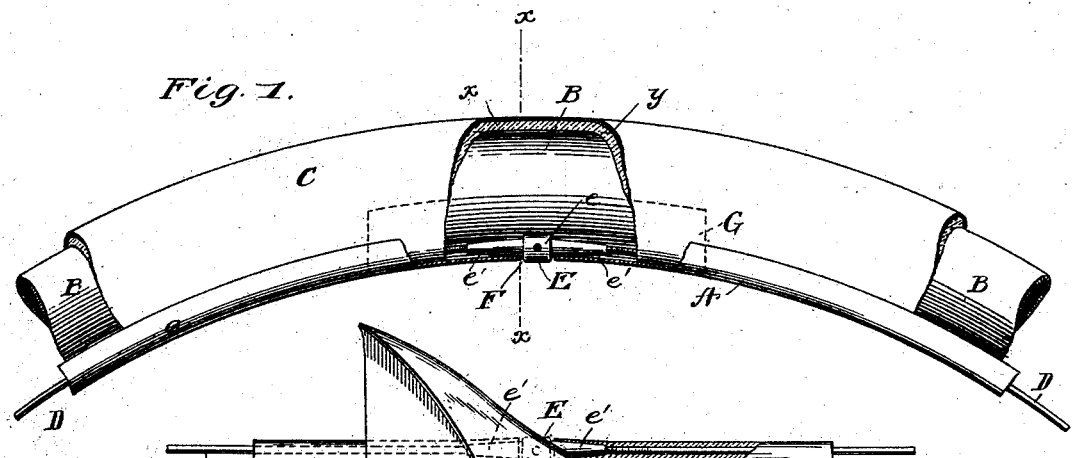

(No Model.)

R. PERKINS.
PNEUMATIC WHEEL.

No. 509,940. Patented Dec. 5, 1893.

WITNESSES:
Frank S. Ober
B. W. Miller

INVENTOR
Robert Perkins
BY
Baldwin, Davidson & Wight
ATTORNEYS.

UNITED STATES PATENT OFFICE.

ROBERT PERKINS, OF ROCKAWAY, NEW JERSEY.

PNEUMATIC WHEEL.

SPECIFICATION forming part of Letters Patent No. 509,940, dated December 5, 1893.

Application filed March 8, 1893. Serial No. 465,074. (No model.)

*To all whom it may concern:*

Be it known that I, ROBERT PERKINS, a subject of the Queen of Great Britain, residing at Rockaway, Morris county, in the State of New Jersey, have invented certain new and useful Improvements in Pneumatic Tires, of which the following is a specification.

My invention relates to that class of pneumatic tires in which the tire or the cover of the inflatable tube is secured to the felly by wires or metal bands, attached to its edges, the ends of each wire being connected by devices which permit of their being drawn together to shorten the wire and cause it to clamp or embrace the felly, or of their being separated to lengthen the wire to permit the removal of the tire or cover.

Heretofore it has been proposed to connect the adjacent ends of the wires by a turn buckle or reversely threaded nut, and such a structure has been utilized in several ways. First, the ends of the wires have been drawn together to such an extent as to permit of their being sprung over the edges of the felly, the tire or cover being then retained in place by the pressure of the air within the inflatable tube or the tire; second, it has been proposed to make an incision in the tire or cover at the point where the nut or turn buckle is located, so as to permit the insertion between the walls of the incision of a thin flat wrench by which the nut may be turned to tighten or loosen the wire; third, it has also been proposed to form a notch or slot in the edge of the felly to permit the insertion of a key or wrench for the manipulation of the nut. In all such cases, however, so far as I am aware, there has been no interlocking connection between the nut and the felly, of such a character as to prevent the circumferential creeping, shifting or moving of the tire upon the felly. Such behavior of the tire or cover is a serious objection for the reason that the air valve which is connected with the inflatable tube within the cover or with the inflation chamber within the tire, usually projects through an aperture in the rim or felly. If the projecting casing of the air valve be of rubber, it is, by the creeping of the tire, either severed by the cutting action of the thin wall of the aperture in the felly through which it projects, or may be dragged out of the aperture and carried between the felly and the tire, where it is inaccessible, and where it constitutes an objectionable enlargement upon the exterior of the felly, and renders the removal of the tire necessary. If the air valve casing be made of metal, as is generally the case, and usually it is made of brass, it may be severed by the edge of the aperture in the felly, being entirely cut off, or may be cut into to such an extent as to destroy its function and purpose.

The object of my invention is to obviate this difficulty, and to that end I provide an interlocking connection between the felly and the nut or turn buckle connecting the ends of the edge wire of the cover and thus positively prevent any creeping of the tire, while at the same time permitting the manipulation of the nuts to contract or expand the securing edge wires. I accomplish this by forming an aperture seat or notch in the felly to permit access to the nut by a key or wrench, and against the walls of which the ends of the nut or shoulders thereon abut.

My invention is designed more especially for bicycles, but is applicable to all classes of pneumatic wheels.

Figure 2:
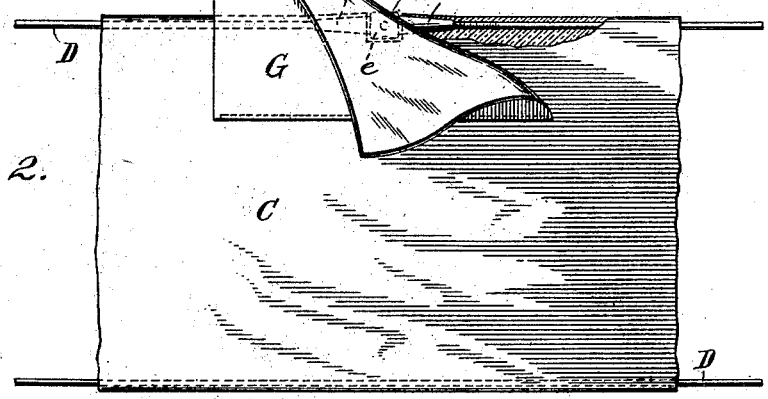
Figure 3:
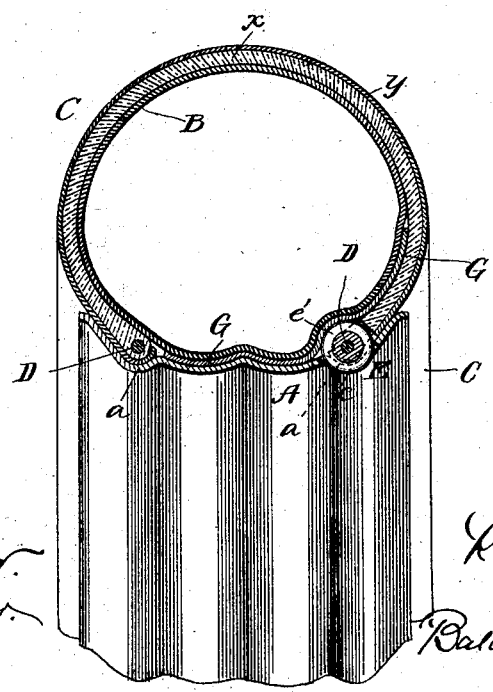

In the accompanying drawings, Figure 1 is a side view of a portion of the tire partly broken away; Fig. 2 a view showing the under side of a section of the cover, and Fig. 3 a section on the line x x of Fig. 1.

A indicates the felly, which may be of the peculiar corrugated cross-section shown, or any other suitable cross-section or style, and B indicates the inflatable tube surrounding the felly.

The cover C, which is made of any ordinary or suitable material for the purpose, has inclosed, embodied or threaded through each edge, a wire D preferably of tin-plated steel or other suitable material. The adjacent ends of each wire are preferably screw-threaded, as shown, and are preferably both engaged by a turn buckle or reversely threaded nut E. The nut is preferably constructed in the manner shown, that is to say, the central part $e$ is cylindrical, and has rounded shoulders or edges, and a threaded hub or extension $e'$ projects from each side of the central portion $e$, in which threaded extensions the ends of the wire screw. The edge of the cover is notched or cut away, as shown, so that, when the edge is turned in between the inflatable tube and the periphery of the felly, the central portion e, of the nut lies in the seat notch or slot F, in the felly, and is accessible from the inside thereof, so that a pin or key may be inserted in the holes therein to screw up or unscrew the nut either to shorten the wire and thus clamp it upon the periphery of the felly, or lengthen it so that the cover may be removed. As stated the shoulders or edges formed by the central portion of the nut e are rounded, but they are preferably only rounded to such an extent as to still leave sufficient shoulders that abut against the walls of the slot in the felly, and prevent the circumferential creeping or shifting of the wire or cover and consequently of the entire tire. The felly, as shown, is circumferentially corrugated and at each edge there is a circumferential corrugation a, in which the edge wire of the cover lies when it is in position. There is, therefore, practically no possibility of the cover being dragged out at the edges when the wires have been properly drawn up by the nuts.

The cover may be of ordinary construction, that is to say, there may be a backing of canvas x, each edge of which is tubular or hollow, for the reception of the edge wire, and a facing of rubber y, that is cemented to the canvas. The edges or shoulders of the central portion e of the nut are preferably rounded to prevent injury to the inflatable tube. To further protect this tube, however, I prefer to place a flap of canvas, rubber or other suitable material inside of the cover to which it may be stitched or otherwise secured. This flap is indicated at G. It is of sufficient width to extend beyond the edge of the cover and when the edge is turned in, the protecting end of the flap is laid between the felly and the inflatable tube. The flap is thus interposed between the nut and the inflatable tube and is smoothly and firmly held by the tube when inflated.

Any suitable devices may be employed for connecting the spokes to the felly and any form of air valve used. I have not thought it necessary in this case to show these parts of a pneumatic wheel; or to illustrate the manner in which the ordinary air valve projects inwardly through an aperture in the felly. As shown, the notch or recess formed in the edge of the cover to receive the nut is only of such width as to receive the central portion e of the nut, and the threaded nipples or extensions of the nut enter the hollow or tubular edge of the canvas.

I claim as my invention—

1. The combination with the felly, of the pneumatic tire, the edge wires thereof which embrace the felly, a nut connecting the ends of each wire by which it may be expanded or contracted, and an interlocking connection between the nut and felly to prevent the circumferential creeping of the tire.

2. The combination with the notched or slotted felly, of the inflatable tube, its cover, the edge wires thereof, a nut connecting the ends of each wire by which it may be expanded or contracted, each nut lying in a seat or notch in the felly and abutting against the walls thereof to prevent the circumferential creeping of the tire.

3. The combination of the notched or slotted felly, the inflatable tube, its cover, the edge wires thereof, a nut connecting the ends of each wire and having a central enlargement or collar and reversely threaded projecting hubs or nipples in which the threaded ends of the wires engage, the collar of each nut lying in a seat or notch in the felly and its ends abutting against the walls thereof to prevent the circumferential creeping of the cover.

In testimony whereof I have hereunto subscribed my name.

ROBERT PERKINS.

Witnesses:
EDWARD C. DAVIDSON,
FRANK S. OBER.